(12) United States Patent
Lam et al.

(10) Patent No.: US 8,761,172 B2
(45) Date of Patent: Jun. 24, 2014

(54) DATA SWITCHING METHOD AND DEVICE

(75) Inventors: Wan Lam, Shenzhen (CN); Jianlin Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 330 days.

(21) Appl. No.: 13/248,915

(22) Filed: Sep. 29, 2011

(65) Prior Publication Data

US 2012/0020355 A1 Jan. 26, 2012

Related U.S. Application Data

(63) Continuation of application No. PCT/CN2010/071344, filed on Mar. 26, 2010.

(30) Foreign Application Priority Data

Apr. 7, 2009 (CN) .......................... 2009 1 0132681

(51) Int. Cl.
*H04L 12/28* (2006.01)
(52) U.S. Cl.
USPC ............ 370/390; 370/391; 370/412; 370/462
(58) Field of Classification Search
None
See application file for complete search history.

(56) References Cited

U.S. PATENT DOCUMENTS

| 6,212,182 | B1 | 4/2001 | McKeown | |
|---|---|---|---|---|
| 6,678,279 | B1 | 1/2004 | Meredith et al. | |
| 6,747,971 | B1 * | 6/2004 | Hughes et al. | 370/387 |
| 6,956,859 | B2 * | 10/2005 | Davis | 370/397 |
| 7,330,475 | B2 * | 2/2008 | Henrion | 370/410 |
| 7,461,167 | B1 | 12/2008 | Park | |
| 7,912,054 | B2 * | 3/2011 | Ogawa et al. | 370/390 |
| 8,121,122 | B2 * | 2/2012 | Minkenberg et al. | 370/390 |
| 2002/0001304 | A1 * | 1/2002 | Johnson et al. | 370/360 |
| 2002/0018469 | A1 * | 2/2002 | Davis | 370/390 |
| 2002/0131412 | A1 * | 9/2002 | Shah et al. | 370/390 |
| 2003/0231588 | A1 * | 12/2003 | Roth et al. | 370/230 |
| 2006/0002298 | A1 * | 1/2006 | Suzuki et al. | 370/235 |

FOREIGN PATENT DOCUMENTS

| CN | 1859275 A | 11/2006 |
|---|---|---|
| CN | 1859279 A | 11/2006 |
| CN | 101527686 A | 9/2009 |
| CN | 101527686 B | 8/2011 |
| WO | WO 2008/074191 A1 | 6/2008 |

OTHER PUBLICATIONS

International Search Report issued in corresponding PCT Patent Application No. PCT/CN2010/071344, mailed Jul. 1, 2010.
Written Opinion of the International Searching Authority issued in corresponding PCT Patent Application No. PCT/CN2010/071344, mailed Jul. 1, 2010.

* cited by examiner

*Primary Examiner* — Kibrom T Hailu
(74) *Attorney, Agent, or Firm* — Brinks Gilson & Lione (57) ABSTRACT

The embodiments of the present invention discloses a data switching method and a switching device, which relates to network technologies. The method is easy to implement, and saves system resources. In unicast switching, resource used for cells reordering at the egress is greatly reduced; in multicast switching, the scheduling is easy and the data pass rate is high. The data switching method includes: receiving a switching request for switching a cell; arbitrating the switching request and obtaining an arbitration result; and performing corresponding switching for the cell, where the switching includes unicast switching and multicast switching, according to the arbitration result.

19 Claims, 5 Drawing Sheets

DATA SWITCHING METHOD AND DEVICE

CROSS-REFERENCE TO RELATED APPLICATIONS

This application is a continuation of International Application No. PCT/CN2010/071344, filed on Mar. 26, 2010, which claims priority to Chinese Patent Application No. 200910132681.6, filed on Apr. 7, 2009, both of which are hereby incorporated by reference in their entireties.

FIELD OF THE INVENTION

The present invention relates to network technologies, and in particular, to a data switching method and a switching device.

BACKGROUND OF THE INVENTION

With the rapid development of network technologies and popularity of network applications, the switch fabric system needs to support both switching unicast traffic and multicast traffic.

Figure 1:
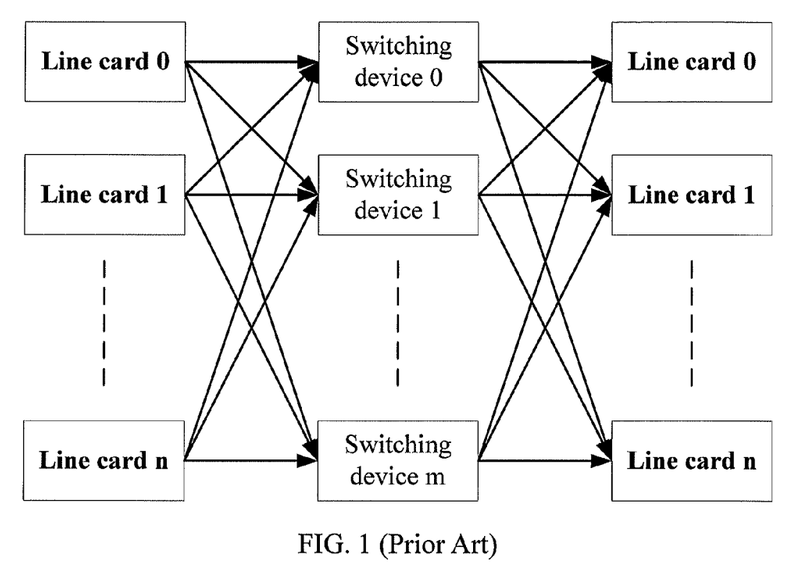
FIG. 1 is a schematic diagram of a structure of a switch fabric system.

FIG. 1 is a schematic diagram of a structure of a switch fabric system. The interface system on the left side may include n line cards or n fabric interface chips. The data cell or data packet output by any device in this system can pass through any switching device in an intermediate switch fabric system, such as m switch fabric chips or boards, and arrive at any device (such as a line card), which is a destination port, in the interface system on the right side. That is, the data cell or data packet (uniformly called "cell" herein to simplify description) sent by an ingress port can pass through different switch fabric chips before arriving at the destination port.

At present, a common switching mechanism for implementing an intermediate switch fabric system is a crossbar (XB) mechanism. When data is switched in a crossbar mechanism, the ingress port sends a scheduling request to the switch fabric system first, indicating that a cell existing on this line card is destined for a destination port; afterward, the switch fabric system performs arbitration according to a certain matching algorithm, generates a grant after the arbitration, and notifies the grant information to all line cards. After receiving the cell sent by each line card according to the grant, the crossbar configures crosspoints between each ingress port and each egress port according to the matching result, thus finishing data switching.

Besides, the crossbar switch fabric may need to deskew the cells received from different ingress ports successively at the ingress through a certain buffer before configuring the crosspoints.

In the process of implementing the present invention, the inventor finds at least the following problems in the prior art: The crossbar mechanism has the characteristic of centralized scheduling; the scheduling algorithm and the scheduling process of the crossbar mechanism are suitable for switching of unicast data, but not suitable for switching of multicast data; if the existing crossbar mechanism is used to switch multicast data, plenty of bandwidth from the ingress port to the intermediate switch fabric is occupied. That is, if the crossbar processes unicast data and multicast data simultaneously, the efficiency of data switching is reduced and more system resources are consumed.

SUMMARY OF THE INVENTION

Embodiments of the present invention provide a data switching method and a switching device to perform unicast switching and multicast switching for cells respectively.

An embodiment of the present invention provides a data switching method, including:
receiving a switching request for switching a cell;
arbitrating the switching request and obtaining an arbitration result; and
performing unicast switching for the cell through a crossbar mechanism if the arbitration result is to perform unicast switching for the cell; or
performing multicast switching for the cell through a store-and-forward mechanism if the arbitration result is to perform multicast switching for the cell.

Another embodiment of the present invention provides a switching device, including:
a receiving unit, configured to receive a switching request for switching a cell;
an arbitrating unit, configured to arbitrate the switching request received by the receiving unit and obtain an arbitration result; and
a switching unit, configured to: perform the switching for the cell according to the arbitration result of the arbitrating unit, where the switching includes unicast switching and multicast switching, and the switching unit performs unicast switching for the cell through a crossbar mechanism if the arbitrating unit determines to perform unicast switching for the cell, or perform multicast switching for the cell through a store-and-forward mechanism if the arbitrating unit determines to perform multicast switching for the cell.

In the technical solution provided herein, a hybrid mechanism is applied to implement unicast switching and multicast switching; the switching request for switching a cell is arbitrated, and the arbitration result indicates whether to perform unicast switching or multicast switching for the cell. In this way, the cells can be unicast switched and multicast switched respectively, thus improving the efficiency of data switching and saving the system resources.

BRIEF DESCRIPTION OF THE DRAWINGS

To make the technical solution in the embodiments of the present invention or in the prior art clearer, the following outlines the accompanying drawings involved in the description of the embodiments of the present invention or the prior art. Apparently, the accompanying drawings outlined below are illustrative and persons of ordinary skill in the art can derive other drawings from such accompanying drawings without any creative effort.

DETAILED DESCRIPTION OF THE EMBODIMENTS

The following detailed description is given with reference to the accompanying drawings to provide a thorough understanding of the technical solution in the embodiments of the present invention. Evidently, the drawings and the detailed description are merely representative of particular embodiments of the present invention, and the embodiments are illustrative in nature and not exhaustive. All other embodiments, which can be derived by those of ordinary skill in the art from the embodiments given herein without any creative effort, shall fall within the protection scope of the present invention.

Figure 3:
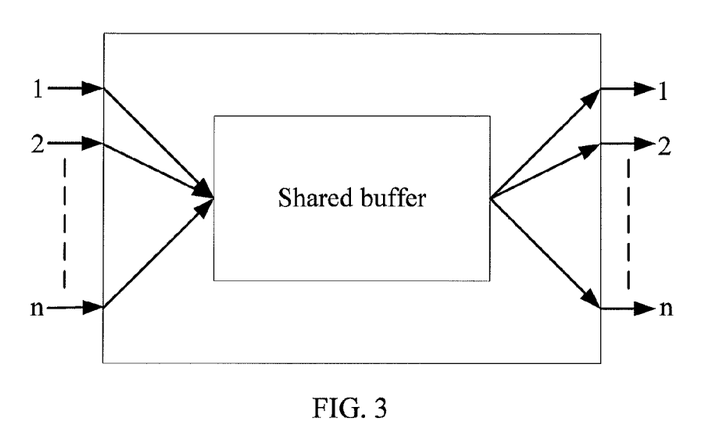
FIG. 3 is a schematic diagram of an internal structure of a switch fabric chip in an SM mechanism.

The first embodiment of the present invention provides a data switching method, as shown in FIG. 3. The method includes the following steps:

Step 21: A switching request for switching a cell is received.

Before a cell from the ingress is switched, a switching request needs to be sent to the switch fabric system. The switching request may be carried in the header of the cell, or may be sent in other appropriate implementation modes. For example, an independent switching request message is sent. Cell type information may be added in the header of the cell to indicate the type of the cell. For example, the cell type may be multicast cell, unicast cell, or null cell.

The switch fabric system may further determine whether the cell type of this cell is the same as the cell type of a cell which has been granted after the arbitration for switching according to the cell type.

However, without being limited hereto, other necessary information may also be carried in the header of the cell according to the actual needs or the applied network protocol. For example, the cell header carries a destination port identifier which is configured to indicate the output port corresponding to the input port; or, if Quality of Service (QoS) is supported, the cell header carries a priority bit to differentiate the priority of the unicast/multicast requests, or priority of different data sources, or priority of different line cards.

The implementation modes of the cell type, destination port identifier, and priority bit are not restricted. For example, for unicast switching, the destination port identifier may be carried in the unicast request or indicated by an independent bit.

Table 1 shows a mode of implementing a data structure of a cell header. The switching requests include a multicast request and a unicast request. Optionally, Table 2 shows a mode of implementing a multicast request and a unicast request. A multicast request occupies 1 bit, and a unicast request occupies n bits. The value of n depends on the number of destination ports. If 16 destination ports exist, the value of n is 16. Each bit may correspond to an output destination port. However, without being limited hereto, the unicast request or multicast request may be originated in any other appropriate forms.

When a unicast cell from the ingress needs to be switched, the corresponding bit in the n bits of the unicast request is set to be valid according to the destination port of the unicast cell; in this case, when a multicast cell from the ingress needs to be switched, the corresponding bit in the multicast request may be set to be valid as well.

Further, the cell header needs to indicate the cell type corresponding to the payload of the cell. The cell type can at least be used to differentiate the unicast cell and multicast cell.

TABLE 1

| Multicast request | Unicast request | Cell type | Payload |
| --- | --- | --- | --- |

TABLE 2

| Multicast request (1 bit) | Unicast request (n bits) |
| --- | --- |

Step 22: An arbiter in the switch fabric arbitrates the switching request and obtains an arbitration result.

In this embodiment, the arbitration result indicates whether to perform unicast switching or multicast switching for the cell. Although the multicast switching and the unicast switching are taken as examples here, other appropriate switching modes may also be practicable. In this embodiment, the arbitration result indicates whether to perform unicast switching or multicast switching for the cell.

For the initial data switching, the ingress line card sends a null cell that carries a unicast request and/or a multicast request to the switch fabric system. The arbiter grants after the arbitration to perform the corresponding switching such as unicast switching or multicast switching according to the type of the switching request. As shown in Table 1, on the next occasion of sending data, the information inserted into the cell header at the ingress includes: payload, cell type, and unicast request and/or multicast request for next data switching.

The switch fabric switches the payload carried in the cell according to the arbitration result of the arbiter; meanwhile, the arbiter arbitrates the switch request currently carried in the cell header and grants the next data switching. The foregoing operations are repeated to ensure the continuity of data switching.

The arbiter may obtain an arbitration result of the switching request according to the received multicast cell and QoS strategy.

For example, when both a unicast request and a multicast request exist in the switching request for switching a cell, if the arbiter determines that fewer multicast cells are received and stored in the memory and that the multicast switching has priority over the unicast switching according to the QoS strategy, the arbiter decides to receive the multicast request and allocates multicast bandwidth; if the arbiter determines that many multicast cells are received and stored in the memory and that the unicast switching needs to be performed currently according to the QoS strategy, for example, if the QoS strategy is that one multicast request is processed after the processing of three unicast requests, and that the unicast request needs to be processed currently, the arbiter decides to receive the unicast request and allocates unicast bandwidth. However, without being limited hereto, the arbiter may make arbitration according to both the received multicast cell and the QoS strategy, or according to either the received multicast cell or the QoS strategy, or the arbiter uses one of them as a primary basis of arbitration and uses the other for reference.

Because the mode of passing through the switch fabric varies between unicast and multicast, if the unicast switching and the multicast switching occur simultaneously, after the arbitration result is obtained, the method in this embodiment further includes: allocating bandwidth to the cell according to the arbitration result. In this embodiment, the bandwidth includes ingress bandwidth and egress bandwidth.

The corresponding ingress bandwidth is allocated to the cell in the following way:

If the switching request for switching a cell received from the ingress port includes both a unicast request and a multicast request, for the cell to be switched, the arbiter obtains an arbitration result according to the storage capacity of the received multicast cells in the memory and the QoS strategy; and determines, according to the arbitration result, whether to receive the unicast request but ignore the multicast request, or to receive the multicast request but ignore the unicast request. That is, the arbiter can "filter" the switching requests, and then allocate the egress bandwidth.

For example, if the cell from the ingress line card 1 carries both a unicast request and a multicast request, if the arbiter receives the multicast request, the arbiter allocates multicast bandwidth to the cell so that the multicast cell can be received from the ingress line card, and ignores the unicast switching request for the cell; if the arbiter receives the unicast request, the arbiter allocates unicast bandwidth to the cell so that the unicast cell can be received from the ingress line card, and ignores the multicast request for the cell.

If the multicast request is received, the arbiter transmits the grant that allows multicast to the ingress line card after the completion of the arbitration and the grant is carried in the cell header. Finally, the multicast cell corresponding to the grant is transmitted to the switch fabric through the allocated ingress bandwidth, and stored in the shared memory, as described in step 33.

The corresponding egress bandwidth is allocated to the cell in the following way:

The arbiter allocates egress bandwidth through the QoS strategy according to the multicast request of the multicast cell in the memory, and according to the unicast request of the cell to which the ingress bandwidth is already allocated.

The arbiter replicates the multicast cell stored in the shared memory, and then the multicast cell enters the corresponding destination queue. If the queue is not empty, a multicast dequeue request may be sent to the arbiter.

For the multicast cell, the arbiter first allocates ingress bandwidth and then allocates egress bandwidth. The ingress bandwidth allocation and the egress bandwidth allocation are generally two different steps. For the unicast cell, the arbiter allocates bandwidth according to the crossbar mechanism. That is, the arbiter determines whether to allocate ingress bandwidth of the switch fabric to the unicast cell or the multicast cell according to the buffer of the multicast cell in the memory of the chip and the QoS strategy. If the multicast bandwidth is allocated first, the arbiter ignores the unicast request from the corresponding port; if the unicast bandwidth is allocated first, the arbiter ignores the multicast request from the port.

Afterward, the arbiter allocates the egress bandwidth according to the "filtered" unicast request and the multicast request in the memory. After the completion of allocating ingress bandwidth and egress bandwidth once, the unicast request may fail to obtain the egress bandwidth. In this case, the ingress bandwidth occupied by the unicast request is also released, and the arbiter may reallocate the remaining ingress bandwidth to the multicast request from the ingress port.

Step 23: The received cell is switched according to the arbitration result. The switching includes unicast switching and multicast switching.

In this embodiment, a crossbar mechanism is used to perform unicast switching for the corresponding cell, and a store-and-forward mechanism is used to perform multicast switching for the corresponding cell.

After an arbitration result is obtained and the ingress bandwidth and egress bandwidth are allocated, the current data is switched according to the arbitration result. In this embodiment, the shared memory mechanism in the store-and-forward mechanism is used to process the multicast cell. However, without being limited hereto, other implementation modes of the store-and-forward mechanism are also practicable. The same applies hereinafter.

The unicast cell and multicast cell can be differentiated according to the cell types listed in Table 1. If the type of the currently processed cell is consistent with the type of a cell that is arbitrated and granted for switching, the corresponding operations are performed. For example, unicast switching is performed for the corresponding cell through the allocated unicast bandwidth according to the crossbar mechanism, and multicast switching is performed for the corresponding cell through the allocated multicast bandwidth according to the shared memory mechanism.

Figure 2:
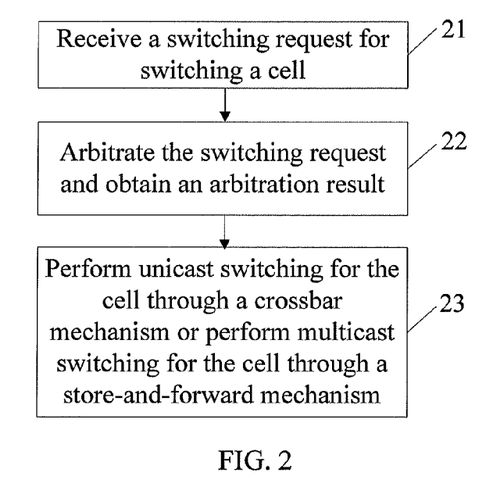
FIG. 2 is a flowchart of a data switching method according to a first embodiment of the present invention.

The preceding description is a switch fabric mechanism which uses a crossbar and a shared memory to process the unicast cell and the multicast cell respectively. FIG. 2 is a simplified flowchart for ease of understanding. In this embodiment, shared memory switching is a typical mode of implementing the store-and-forward mechanism. The following describes the implementation mode of shared memory switching mechanism in the embodiment of the present invention in detail.

FIG. 3 shows an internal structure of a switch fabric chip in a shared memory mechanism. The cells from n ingress ports on the left side need to be buffered in the same shared memory in the middle. The memory space is divided into n independent buffer areas according to the egress port or the memory is shared in a link list mode. Each independent buffer area or the link list corresponds to a destination port queue. At the time of scheduling a cell out of a queue, each egress port reads the cell in the corresponding independent buffer area; and outputs the cell.

In the shared memory mechanism shown in FIG. 3, all ports read and write cells in the same memory simultaneously. Therefore, the bandwidth required for reading and writing the memory is $2n \cdot r$, where r is the port rate. The memory can hardly support such bandwidth. Therefore, the shared memory is generally made up of several memories.

Figure 4:
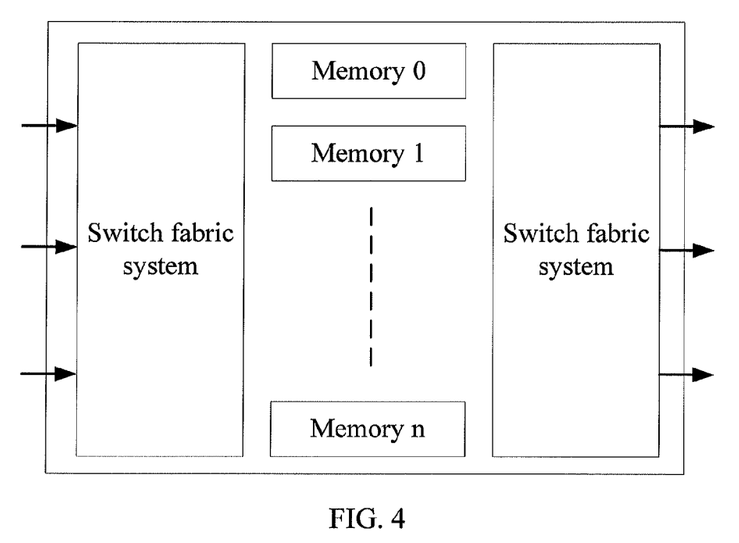
FIG. 4 is schematic diagram of a switching method in a shared buffer switching mechanism according to the first embodiment of the present invention.

As shown in FIG. 4, the cell to be switched enters the switch fabric system on the left side first. The switch fabric system allocates ingress bandwidth to the cell. The cell is buffered into the corresponding memory according to the destination port, or distributed to the intermediate memories averagely in a load balance mode. When outputting the cell, the switch fabric system allocates egress bandwidth to the cell, replicates the cell in the memory, and reads the cell out of the corresponding memory. The cell arrives at the destination port through the switch fabric system on the right side. It is understandable that the two switch fabric systems in FIG. 4 may be the same switch fabric system.

Figure 5:
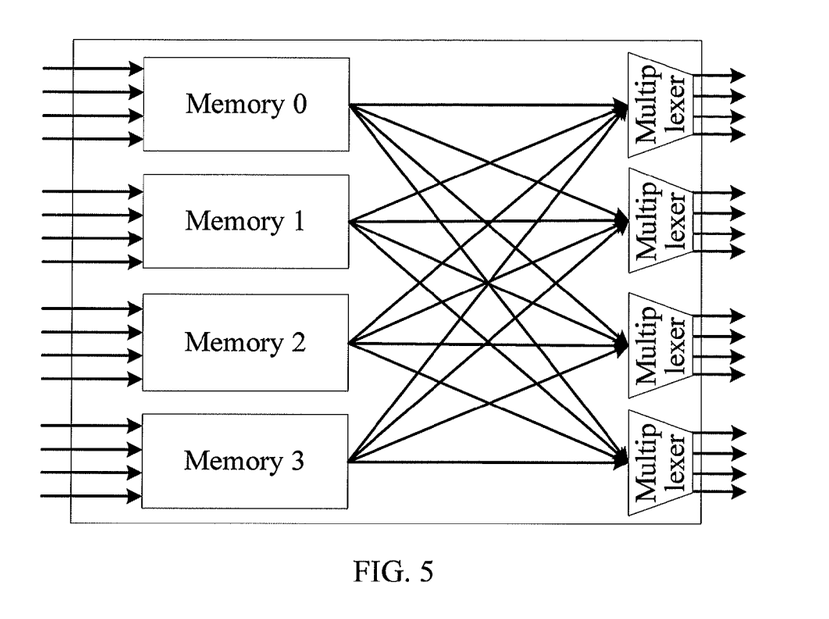
FIG. 5 is a schematic diagram of a typical implementation of a shared buffer switching mechanism according to the first embodiment of the present invention.

FIG. 5 is an exemplary implementation of FIG. 4. It is assumed that there are 16 ingress ports, 16 egress ports, and 4 memories. The cells from the 16 ingress ports are buffered into the 4 memories, and sent to the multiplexers (MUX) in turn through the reading ports of the 4 memories. The multiplexers output the cells to the 16 egress ports on the right side. Optionally, cells can be sent in turn before the cells enter the memories. That is, in a shared memory mechanism, a memory is set for buffering data. When any free space exists in the memory, the flow control may notify the ingress line card to input cells into the memory. The cells are switched in a store-and-forward mode.

Because a buffer is added in the switch fabric in the shared memory switching mechanism, no matching process like a crossbar is required between the ingress port and the egress port, and the flow control may notify the ingress line card to input multicast cells only if any free space exists in the buffer. The multicast cells received by the shared memory are replicated in the memory first, and then scheduled according to the egress respectively in a mode like unicast mode.

In the first embodiment of the present invention, the characteristics of both the crossbar mechanism and the shared memory mechanism are used; the unicast cells are switched through the crossbar mechanism, and the multicast cells are switched through the shared memory mechanism. After the cells are input from the ingress port, several copies of the multicast cells are generated and buffered into the several correlated memories, and the multicast cells are thus enqueued. When being output, the multicast cells are output according to the foregoing scheduling algorithm. For the unicast cells, the connection from the ingress port to the maximally matched egress port is set up according to the switching request, and the unicast cells are output through this connection.

In conclusion, in the technical solution provided herein, a hybrid mechanism is used to switch unicast cells and multicast cells. A crossbar mechanism is applied to unicast cells, and no large-capacity memory needs to be configured; a shared memory switching mechanism is applied to multicast cells, and no complicate scheduling algorithm is required for scheduling between the ingress line card and the switch fabric. Moreover, head of Link blocking is reduced, and the problems caused by a single mechanism applied to unicast switching and multicast switching in the prior art are overcome. The method disclosed herein is easy to implement, and saves system resources. In unicast switching, resource used for cells reordering at the egress is greatly reduced; in multicast switching, the data pass rate is high.

Figure 6:
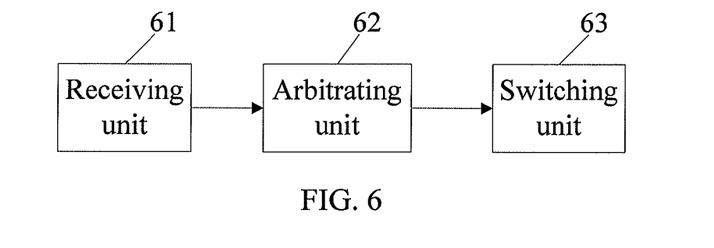
FIG. 6 is a schematic diagram of a structure of a switching device according to a second embodiment of the present invention.

The second embodiment of the present invention provides a switching device, as shown in FIG. 6. The device includes:

a receiving unit 61, configured to receive a switching request for switching a cell;

an arbitrating unit 62, configured to arbitrate the switching request received by the receiving unit 61 and obtain an arbitration result, where the arbitration result is to perform corresponding switching for the cell, where the switching includes unicast switching and multicast switching. In this embodiment, the arbitration result may indicate whether to perform unicast switching or multicast switching for the cell; and a switching unit 63, configured to perform corresponding switching for the cell, where the switching includes unicast switching and multicast switching, according to the arbitration result of the arbitrating unit 62.

If the arbitrating unit 62 decides to perform unicast switching for the cell, the switching unit 63 uses a crossbar mechanism to perform unicast switching for the cell; or, if the arbitrating unit 62 decides to perform multicast switching for the cell, the switching unit 63 uses a store-and-forward mechanism to perform multicast switching for the cell.

The switching request received by the receiving unit 61 includes a multicast request and a unicast request. The arbitrating unit 62 may obtain an arbitration result of the switching request according to the received multicast cell and QoS strategy. When both a unicast request and a multicast request exist in the switching request, if the arbitrating unit 62 determines that fewer multicast cells are received and stored in the memory and that the multicast switching has priority over the unicast switching according to the QoS strategy, the arbitration result is to receive the multicast request and allocates multicast bandwidth; if the arbitrating unit 62 determines that many multicast cells are received and stored in the memory and that the unicast switching needs to be performed currently according to the QoS strategy for example, if the QoS strategy is that one multicast request is processed after the processing of three unicast requests, and the unicast request needs to be processed currently, the arbitration result is to receive the unicast request and allocates unicast bandwidth. However, without being limited hereto, the arbitrating unit 62 may make arbitration according to both the received multicast cell and the QoS strategy, or according to either the received multicast cell or the QoS strategy, or the arbitrating unit uses one of them as a primary basis of arbitration and uses the other for reference.

Further, considering that the mode of passing through the switch fabric varies between unicast and multicast, the arbitrating unit 62 is also configured to allocate bandwidth to the cell according to the arbitration result. In this embodiment, the bandwidth allocation includes allocating ingress bandwidth and egress bandwidth to the cell.

For multicast cells, a memory needs to be set for storing and replicating the received cells. In view of delay in the transmission, the unicast cells are generally stored for a short period of time before switching, so as to eliminate the time deviation when the receiving link receives the cells. In the second embodiment of the present invention, the unicast cells and the multicast cells are processed by the same switching unit 63 uniformly.

For ease of management, the memory set in the switching unit 63 may be configured to store both unicast cells and multicast cells. In this case, the switching unit 63 is also configured to store unicast cells and multicast cells being switched. A small storage area in the memory of the switching unit 63 may be set for storing unicast cells, and the remaining storage area stores multicast cells.

Figure 7:
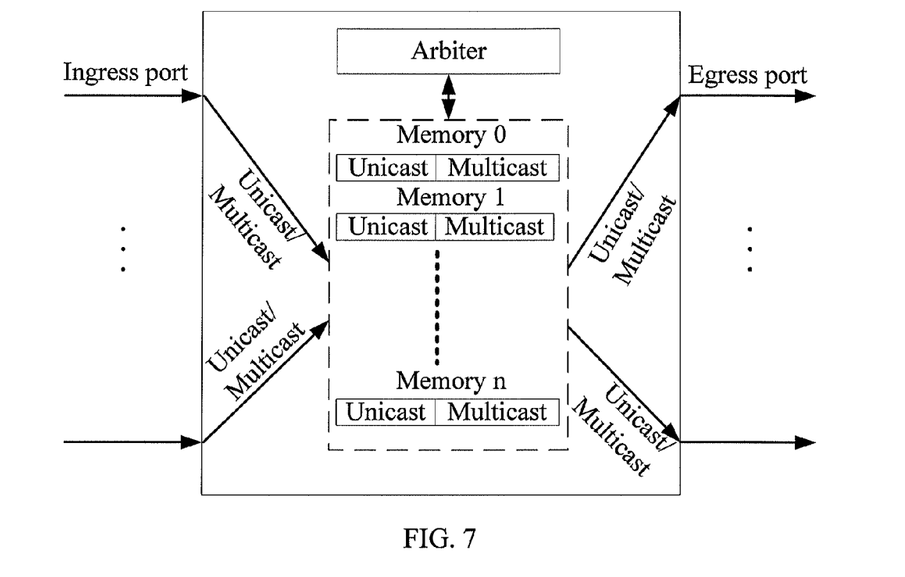
FIG. 7 is a schematic diagram of another structure of the switching device according to the second embodiment of the present invention.

As shown in FIG. 7, in a processing mode, the input path and output path of unicast cells and the input path and output path of multicast cells are the same one. An independent buffer area is set in the corresponding memory of the egress port for storing unicast cells only, and the remaining area stores multicast cells. That is, the buffer space of each memory is divided into two parts. One part stores unicast cells only, and the other part stores multicast cells only.

Before the unicast cells enter the switch fabric chip from the ingress port, the unicast cells are not stored for a short period of time. After being input from the ingress port, the unicast cells are buffered into the unicast buffer area of the corresponding memory according to the destination port, to which the unicast cells are output. The processing of unicast cells differs from the processing of multicast cells in that the unicast cells do need to be replicated for outputting but only need to be buffered in a memory to eliminate the time deviation. Once the switching path of unicast cells is the same one as the switching path of multicast cells, the space for routing in the switch fabric chip is saved and easily managed.

Figure 8:
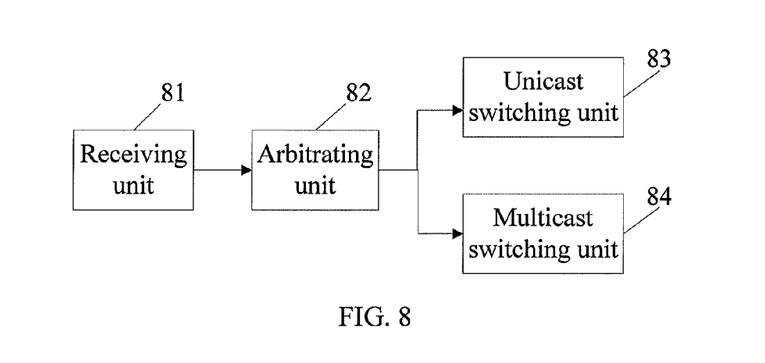
FIG. 8 is a schematic diagram of another structure of the switching device according to the second embodiment of the present invention.

Optionally, the second embodiment of the present invention provides another switching device. As shown in FIG. 8, the switching unit of the switching device may be a unicast switching unit and a multicast switching unit, and the switching device includes:

a receiving unit 81, configured to receive a switching request for switching a cell;

an arbitrating unit 82, configured to arbitrate the switching request received by the receiving unit 81 and obtain an arbitration result; where the arbitration result is to perform corresponding switching for the cell, where the switching includes unicast switching and multicast switching, or, in this embodiment, the arbitration result may indicate whether to perform unicast switching or multicast switching for the cell;

a unicast switching unit 83, configured to perform unicast switching for the cell through a crossbar mechanism if the arbitrating unit 82 determines to perform unicast switching for the cell; and a multicast switching unit 84, configured to perform multicast switching for the cell through a store-and-forward mechanism if the arbitrating unit 82 determines to perform multicast switching for the cell.

The switching request received by the receiving unit 81 may include a unicast request and/or a multicast request. Further, the arbitrating unit 82 is configured to allocate bandwidth to the cell according to the arbitration result. In this embodiment, the bandwidth allocation includes allocating corresponding ingress bandwidth and egress bandwidth to the cell.

Figure 9:
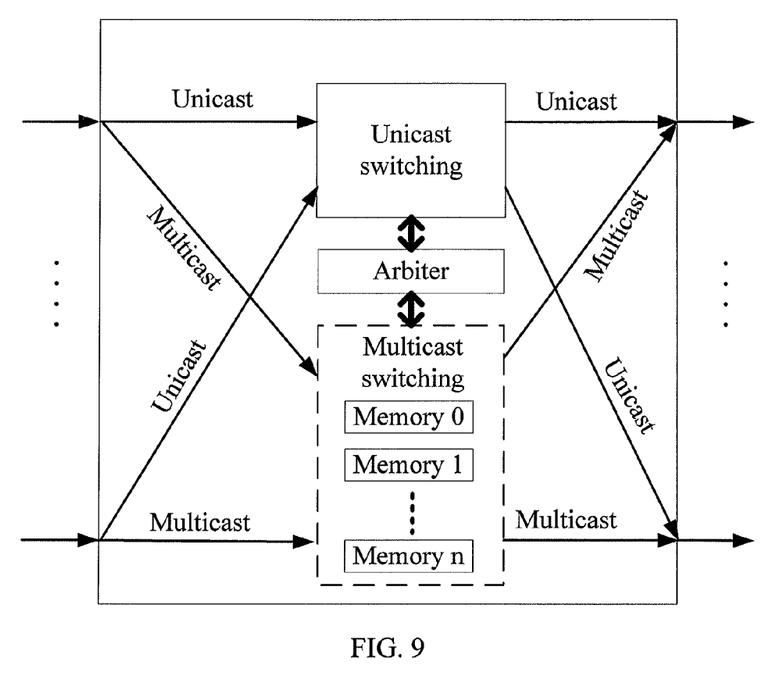
FIG. 9 is a schematic diagram of another structure of the switching device according to the second embodiment of the present invention.

In the second embodiment of the present invention, the unicast switching unit 83 is for switching unicast cells, and the multicast switching unit 84 is for switching multicast cells. As shown in FIG. 9, the second embodiment of the present invention provides a schematic diagram of another structure of the switching device, the memory stores multicast cells only, and the time deviation of the unicast cells is eliminated before the cells enter the switching device.

For the specific implementation of the functional units in the device embodiment of the present invention, see the apparatus embodiment of the present invention described herein.

In the technical solution provided herein, a hybrid mechanism is used to switch unicast cells and multicast cells. A crossbar mechanism is applied to unicast cells, and no large-capacity memory needs to be configured; a shared memory switching mechanism is applied to multicast cells, and no complicate scheduling algorithm is required. Moreover, head of Link blocking is reduced, and the problems caused by a single mechanism applied to unicast switching and multicast switching in the prior art are overcome. The method disclosed herein is easy to implement, and saves system resources. In unicast switching, resource used for cells reordering at the egress is greatly reduced; in multicast switching, the data pass rate is high.

An embodiment of the present invention also provides a switch fabric system. The switch fabric system includes the foregoing switching device for switching unicast cells and multicast cells.

Persons of ordinary skill in the art may understand that all or part of the steps of the method according to the embodiments of the present invention may be implemented by a program instructing relevant hardware. The program may be stored in a computer readable storage medium.

The preceding descriptions are merely exemplary embodiments of the present invention, but not intended to limit the protection scope of the present invention. Any modifications, variations or replacements that can be easily derived by those skilled in the art shall fall within the protection scope of the present invention. Therefore, the protection scope of the present invention is subject to the appended claims.

What is claimed is:

1. A hybrid data switching method for both unicast cells and multicast cells, comprising:

receiving switching requests for switching a plurality of cells, wherein the plurality of cells comprises both unicast cells and multicast cells;

arbitrating the switching requests and obtaining arbitration results for each of the received unicast cells and the multicast cells; and performing, by a multicast switching unit, multicast switching for the received multicast cells through a store-and-forward shared memory mechanism if the arbitration result is to perform multicast switching for the multicast cells;

performing, by a unicast switching unit, unicast switching for the received unicast cells through a crossbar mechanism including a matching process, if the arbitration result is to perform unicast switching for the unicast cells;

wherein when performing the multicast switching through the store-and-forward shared memory mechanism, no matching process in the crossbar mechanism is required; and the store-and-forward shared memory mechanism is implemented in at least one of the following way:

a memory is divided into a plurality of buffer areas, each independent buffer area corresponding to a destination port queue of an egress port; and the memory is shared in a link list mode, such that a link list in the link list mode corresponds to the destination port queue.

2. The method according to claim 1, wherein arbitrating the switching requests and obtaining the arbitration results for each of the unicast cells and the multicast cells further comprising:

arbitrating the switching requests and obtaining the arbitration results according to received multicast cells and unicast cells, and a Quality of Service (QoS) strategy.

3. The method according to claim 1, wherein after obtaining the arbitration results, the method further comprises:

allocating ingress bandwidth and egress bandwidth to each of the received unicast cells and multicast cells according to the arbitration results.

4. The method according to claim 3, wherein the switching requests comprise a unicast request and a multicast request;

wherein allocating the ingress bandwidth to the cell comprises:

allocating the ingress bandwidth to the unicast cells and ignoring the multicast request if the arbitration result determines to receive the unicast request.

5. The method according to claim 3, wherein the switching request comprises a unicast request and a multicast request; and allocating the ingress bandwidth to the received multicast cells and ignoring the unicast request if the arbitration result determines to receive the multicast request.

6. The method according to claim 3, wherein the switching requests comprise switching requests from the received unicast cells and multicast cells received by an ingress port.

7. The method according to claim 3, wherein allocating the egress bandwidth to the cell comprises:

allocating the egress bandwidth to the received multicast cells according to a multicast request of a received multicast cell and according to a unicast request of the received unicast cells to which an ingress bandwidth is already been allocated.

8. The method according to claim 1, wherein a cell from an ingress port is buffered in an intermediate shared memory in the shared memory mechanism.

9. The method according to claim 8, wherein the received multicast cells from the ingress port are buffered in the intermediate shared memory according to a destination port of the multicast cells from the ingress port.

10. The method according to claim 8, wherein the received multicast cells from the ingress port is distributed to the intermediate shared memory in a load balance mode.

11. A hybrid switching device for both unicast cells and multicast cells, comprising:
a receiving unit, configured to receive switching requests for switching a plurality of cells, wherein the plurality of cells comprises both unicast cells and multicast cells;
an arbitrating unit, configured to arbitrate the received switching requests and obtain arbitration results for each of the received unicast cells and the multicast cells;
a unicast switching unit, configured to perform unicast switching for the received unicast cells through a crossbar mechanism including a matching process if the arbitrating unit determines to perform unicast switching for the unicast cells; and
a multicast switching unit, configured to perform multicast switching for the received multicast cells through a store-and-forward shared memory mechanism if the arbitrating unit determines to perform multicast switching for the received multicast cells;
wherein when the multicast switching through the store-and-forward shared memory mechanism is performed by the multicast switching unit, no matching process in the crossbar mechanism is required; and
the store-and-forward shared memory mechanism is implemented in at least one of the following way:
a memory is divided into a plurality of independent buffer areas, each independent buffer area corresponding to a destination port queue of an egress port; and
the memory is shared in a link list mode, such that a link list in the link list mode corresponds to the destination port queue.

12. The device according to claim 11, wherein:
the arbitrating unit is further configured to arbitrate the received switching requests and obtain the arbitration results according to received multicast cells and a Quality of Service (QoS) strategy.

13. The device according to claim 11, wherein:
the arbitrating unit is further configured to allocate ingress bandwidth and egress bandwidth to the received unicast cells and the multicast cells according to the arbitration results.

14. The device according to claim 13, wherein the switching request comprises a unicast request and a multicast request;
the arbitrating unit is further configured to allocate the ingress bandwidth to the received unicast cells and ignore the multicast request if the arbitration result determines to receive the unicast request.

15. The device according to claim 13, wherein the switching requests comprise a unicast request and a multicast request;
the arbitrating unit is further configured to allocate the ingress bandwidth to the received multicast cells and ignore the unicast request if the arbitration result determines to receive the multicast request.

16. The method according to claim 11, wherein the store-and-forward shared memory mechanism comprises a shared memory mechanism; and the received multicast cells from an ingress port in the switching device is buffered in an intermediate shared memory switching device in the shared memory mechanism.

17. The method according to claim 16, wherein the received multicast cells from the ingress port is buffered in the intermediate shared memory according to a destination port of the multicast cells from the ingress port.

18. The method according to claim 16, wherein the received multicast cells from the ingress port are distributed to the intermediate shared memory in a load balance mode.

19. The device according to claim 11, wherein the multicast switching unit comprises the memory that stores multicast cells only.

* * * * *